United States Patent
Hennemann et al.

(10) Patent No.: US 8,814,219 B2
(45) Date of Patent: Aug. 26, 2014

(54) PUSH LOCK PIPE CONNECTION SYSTEM AND DISCONNECTION TOOL

(75) Inventors: Thomas Hennemann, Cottage Grove, MN (US); Garth Saul, Faribault, MN (US); Dean Brabec, North Branch, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 201 days.

(21) Appl. No.: 12/891,544

(22) Filed: Sep. 27, 2010

(65) Prior Publication Data
US 2011/0012339 A1    Jan. 20, 2011

Related U.S. Application Data

(63) Continuation-in-part of application No. 12/365,000, filed on Feb. 3, 2009, now Pat. No. 8,342,579.

(51) Int. Cl.
*F16L 35/00* (2006.01)

(52) U.S. Cl.
USPC ............................................ 285/39; 285/319

(58) Field of Classification Search
USPC .................................. 285/39, 308, 319, 340
See application file for complete search history.

(56) References Cited

U.S. PATENT DOCUMENTS

| | | | |
|---|---|---|---|
| 1,587,079 A * | 6/1926 | Machino | 285/104 |
| 2,111,956 A * | 3/1938 | Baldwin | 285/105 |
| 2,479,960 A * | 8/1949 | Osborn | 285/104 |
| 2,785,910 A | 3/1957 | Munger | |
| 3,272,538 A | 9/1966 | Bergstrom | |
| 3,389,923 A | 6/1968 | Billings | |
| 3,413,021 A | 11/1968 | Potts | |
| 3,534,776 A * | 10/1970 | Gilreath | 285/39 |
| 3,744,824 A | 7/1973 | Roos | |
| 3,784,235 A | 1/1974 | Kessler | |
| 3,995,897 A | 12/1976 | Paskert | |
| 4,030,850 A | 6/1977 | Hyde | |
| 4,072,328 A | 2/1978 | Elliott | |

(Continued)

FOREIGN PATENT DOCUMENTS

| | | |
|---|---|---|
| CH | 688659 A5 | 12/1997 |
| DE | 2440886 A1 | 3/1976 |

(Continued)

OTHER PUBLICATIONS

European Patent Office, European Application No. 10250178.0 Extended European Search Report dated Mar. 5, 2012, pp. 1-6.

(Continued)

*Primary Examiner* — Aaron Dunwoody
(74) *Attorney, Agent, or Firm* — Moore & Van Allen PLLC

(57) ABSTRACT

A disconnection tool for disconnecting pipes which are connected. The disconnection tool is preferably a two piece cylinder with a leading edge and handles opposite the leading edge, and, can be positioned around a male end of a male pipe that is within a female end of a female pipe. The disconnection tool initially inserts into a clearance between the interior surface of the female end and the exterior surface of the male end while the pipes are connected. As the disconnection tool is further inserted, its leading edge contacts and disengages one or more locking members extending through the clearance thereby allowing the male pipe to be disconnected from the female pipe.

44 Claims, 7 Drawing Sheets

(56) References Cited

U.S. PATENT DOCUMENTS

| | | | | |
|---|---|---|---|---|
| 4,105,226 | A | 8/1978 | Frey | |
| 4,128,264 | A | 12/1978 | Oldford | |
| 4,191,384 | A * | 3/1980 | Svedberg | 277/314 |
| 4,276,010 | A | 6/1981 | Shartzer | |
| 4,471,978 | A * | 9/1984 | Kramer | 285/321 |
| 4,490,576 | A | 12/1984 | Bolante | |
| 4,508,369 | A * | 4/1985 | Mode | 285/39 |
| 4,600,223 | A | 7/1986 | de Vries | |
| 4,749,214 | A * | 6/1988 | Hoskins et al. | 285/4 |
| 4,779,902 | A | 10/1988 | Lee | |
| 4,781,400 | A * | 11/1988 | Cunningham | 285/39 |
| 4,854,397 | A | 8/1989 | Warren | |
| 4,875,713 | A | 10/1989 | Carstensen | |
| 4,875,714 | A | 10/1989 | Lee | |
| 4,927,185 | A * | 5/1990 | McNaughton | 285/39 |
| 4,979,765 | A * | 12/1990 | Bartholomew | 285/93 |
| 5,005,877 | A * | 4/1991 | Hayman | 285/315 |
| 5,015,014 | A | 5/1991 | Sweeney | |
| 5,119,892 | A | 6/1992 | Clegg et al. | |
| 5,219,188 | A * | 6/1993 | Abe et al. | 285/93 |
| 5,251,942 | A | 10/1993 | Whaley | |
| 5,378,024 | A * | 1/1995 | Kumagai et al. | 285/39 |
| 5,533,761 | A * | 7/1996 | Ostrander et al. | 285/38 |
| 5,542,717 | A | 8/1996 | Rea | |
| 5,580,100 | A * | 12/1996 | Umezawa et al. | 285/39 |
| 5,584,512 | A | 12/1996 | Carstensen | |
| 5,662,360 | A | 9/1997 | Guzowski | |
| 5,685,575 | A * | 11/1997 | Allread et al. | 285/39 |
| 5,716,081 | A | 2/1998 | Leigh | |
| 5,738,388 | A | 4/1998 | Sundelin | |
| 5,826,921 | A | 10/1998 | Woolley | |
| 5,845,945 | A | 12/1998 | Carstensen | |
| 5,909,901 | A * | 6/1999 | Zillig et al. | 285/308 |
| 5,918,914 | A | 7/1999 | Morris | |
| 5,934,709 | A * | 8/1999 | Morrison | 285/39 |
| 5,971,445 | A | 10/1999 | Norkey | |
| 5,975,591 | A | 11/1999 | Guest | |
| 5,988,704 | A | 11/1999 | Ryhman | |
| 5,988,705 | A | 11/1999 | Norkey | |
| 6,062,326 | A | 5/2000 | Strong | |
| 6,152,496 | A | 11/2000 | Kouda | |
| 6,176,523 | B1 | 1/2001 | Winslett | |
| 6,325,424 | B1 | 12/2001 | Metcalfe | |
| 6,343,814 | B1 * | 2/2002 | Bucher et al. | 285/319 |
| 6,401,820 | B1 | 6/2002 | Kirk | |
| 6,464,024 | B2 | 10/2002 | Beaton | |
| 6,499,771 | B1 | 12/2002 | Snyder, Sr. | |
| 6,568,658 | B2 | 5/2003 | Strome | |
| 6,666,480 | B2 | 12/2003 | Haney | |
| 6,688,655 | B1 * | 2/2004 | Watanabe | 285/321 |
| 6,964,435 | B2 | 11/2005 | Wolf | |
| 6,988,747 | B2 | 1/2006 | Allen | |
| 7,029,035 | B2 | 4/2006 | Seymour, II | |
| 7,097,211 | B2 * | 8/2006 | Adams | 285/321 |
| 7,261,326 | B2 | 8/2007 | Haney | |
| 7,264,281 | B2 * | 9/2007 | Le Quere | 285/308 |
| 7,425,024 | B2 | 9/2008 | Haney | |
| 7,445,247 | B2 * | 11/2008 | Ericksen et al. | 285/39 |
| 7,445,250 | B2 * | 11/2008 | Swift et al. | 285/321 |
| 7,455,328 | B2 | 11/2008 | Chelchowski | |
| 7,469,933 | B2 * | 12/2008 | Swift et al. | 285/86 |
| 7,470,383 | B2 | 12/2008 | Haney | |
| 7,523,966 | B2 | 4/2009 | O'Neill | |
| 7,810,850 | B2 | 10/2010 | O'Neill | |
| 7,819,438 | B2 * | 10/2010 | Swift et al. | 285/321 |
| 7,832,774 | B2 * | 11/2010 | Densel et al. | 285/308 |
| 7,841,630 | B1 | 11/2010 | Auray | |
| 7,963,570 | B2 * | 6/2011 | Swift et al. | 285/321 |
| 2003/0094813 | A1 * | 5/2003 | Bucher et al. | 285/319 |
| 2003/0116960 | A1 * | 6/2003 | Yates | 285/39 |
| 2003/0122372 | A1 * | 7/2003 | Muto | 285/39 |
| 2004/0070198 | A1 * | 4/2004 | Rohrig | 285/39 |
| 2004/0245766 | A1 * | 12/2004 | Vallee | 285/39 |
| 2006/0214422 | A1 | 9/2006 | Cuvo | |
| 2007/0001450 | A1 * | 1/2007 | Swift et al. | 285/306 |
| 2009/0278347 | A1 * | 11/2009 | Kerin et al. | 285/39 |

FOREIGN PATENT DOCUMENTS

| | | |
|---|---|---|
| EP | 0664405 | 1/1995 |
| EP | 1669655 A1 | 6/2006 |
| EP | 1703191 A2 | 9/2006 |
| EP | 1933074 A2 | 6/2008 |
| FR | 2810087 A1 | 12/2001 |
| GB | 1584 085 A | 2/1981 |
| WO | WO 00/57096 A1 | 9/2000 |
| WO | WO 2004/104365 | 12/2004 |

OTHER PUBLICATIONS

European Patent Office, European Application No. 10250178.0 Office Action dated Jul. 30, 2013, pp. 1-4.

Mid-Continent, "PVC Water Well Casings and Screens" brochure, pp. MP00014-MP00017, published Apr. 1975, place of publication—unknown.

VMT Fibreglass Industries, "Glasspoll Fibregrass Reinforced Plastic Pipers and Screens" brochure, pp. 1-4, Jan. 1998, place of publication—unknown.

Eastern District of Pennsylvania, Order construing term "predetermined interior diameter" of U.S. Patent No. 6,666,480, {Doc. No. 116), p. 1, Oct. 24, 2005, Civil Action No. 03-CV-2131, published on PACER (www.pacer.gov).

Eastern District of Pennsylvania, "Memorandum of Plaintiff Certainteed Corporation in Support of Motion for Summary Judgment of Invalidity of the Patent in Suit," {Doc. No. 92), pp. 4-7. 9-12, Sep. 19, 2005, Civil Action No. 03-CV-2131, published on PACER (www.pacer.gov).

Marcel Decker, Inc., Thomas Sixsmith, "Handbook of Thermoplastic Piping System Design," pp. 137-141, 1997, ISBN No. 0-8247-9846-5.

Certainteed Corporation, "Kwik-Set (R) Threaded Drop Pipe" brochure, p. 1, 2004, place of publication—unknown.

Eastern District of Pennsylvania, "Memorandum and Order" construing certain claim terms of U.S. Patent No. 6,666,480, {Doc. No. 75), pp. 1-19, May 2, 2005, Civil Action No. 03-CV-2131, Published on PACER (www.pacer.gov).

Transcript of Nov. 18, 2004 deposition of Norther Products witness Victor Weigel pp. 40-41, 85-91, Civil Action No. A3-04-18 in the North Dakota District Court, Southeastern Division.

Transcript of May 12, 2004 deposition of Certainteed Corportaion witness John Stott, pp. 120 and 209-214, Civil Action No. 03-CV-2131 in the Untied States District Court, Eastern District of Pennsylvania.

* cited by examiner

PUSH LOCK PIPE CONNECTION SYSTEM AND DISCONNECTION TOOL

This application is a continuation-in-part of prior U.S. patent application Ser. No. 12/365,000, filed Feb. 3, 2009, which is incorporated herein by reference.

BACKGROUND OF THE INVENTION

1. Field of the Invention

The present invention relates generally to a pipe disconnection tool and methods of disconnecting pipes with the disconnection tool. More specifically, the preferred embodiment of the present invention relates to a disconnection tool for removing the male end of a pipe that is inserted into the female end of an adjacent pipe. The insertion tool fits around the male end of the pipe while the male end is inserted into the female end of the adjacent pipe, and, the disconnection tool inserts within a clearance and disengages the male end from the female end.

2. Description of the Related Art

U.S. patent application Ser. No. 12/365,000 offers a pipe connection system that allows for quick, secure connections to be formed between a pipe and a similar adjacent pipe. Unlike traditional pipe connections, the connection system in application Ser. No. 12/365,000 does not require gluing, threading, and/or welding to connect the pipe and the similar adjacent pipe. Instead, rigid fingers extend from an interior surface of the female end of the pipe and lock the male end of a connecting pipe into place within the female end.

The interior surface of the female end of the pipe defines a male end receiving chamber. The rigid fingers extend into the male end receiving chamber from interior circumferential grooves on the interior surface of the female end prior to insertion of the male end of the connecting pipe. The rigid fingers are displaceable and displace toward the interior surface of the female end during insertion of the male end. When the male end of the connecting pipe is fully inserted, the rigid fingers are positioned over corresponding exterior circumferential grooves on the surface of the male end and because the rigid fingers are biased toward their non-displaced position they extend into these corresponding exterior circumferential grooves.

The rigid fingers each have a distal end that enters into and remains within the exterior circumferential groove of the male end. The distal end of the rigid fingers abuts a sidewall of the exterior circumferential groove to prevent withdrawal of the male end of the connecting pipe from the female end of the pipe. Once connected, however, the male end cannot be removed from the female end without destruction of at least a portion of the pipe and/or the connecting pipe. As a result, the pipe and/or the connecting pipe cannot be reused. It is therefore desirable to have a disconnection tool for disconnection of the pipe and the connecting pipe which will allow reuse of the pipe and the connecting pipe, as well as a method for achieving such disconnection.

BRIEF SUMMARY OF THE INVENTION

The present invention is a disconnection tool that enables disconnection of a pipe connected to an adjacent pipe through the connection system disclosed in application Ser. No. 12/365,000 and/or connections systems similar thereto. For purposes of this simplicity and coherence, the pipe with a connecting female end is hereinafter referred to as a "female pipe" and the pipe with a connecting male end is referred to as a "male pipe."

The disconnection tool of the present invention is shaped to fit around the male end of the male pipe when the male pipe is connected to the female end of the female pipe. The disconnection tool has an insertion member with an insertion length that is insertable into a clearance between the male end of the male pipe and the female end of the female pipe. Once around the male end, force is applied to the insertion member or, preferably, to a handle extending from the insertion member and thereby causing the insertion member to insert into the clearance between the pipes.

During insertion, a leading edge of the insertion member contacts and disengages at least one locking member which is engaged with the pipes. In the preferred embodiment—i.e., when the disconnection tool is used with pipes connected through the system disclosed in application Ser. No. 12/365,000—the insertion length displaces the distal end of the rigid fingers from an exterior circumferential groove on the male end of the male pipe.

Once the disconnection tool is fully inserted, the male end of the male pipe can be withdrawn from the female end of the female pipe by simply pulling the pipes apart. Once the male end is withdrawn, the insertion member is removed from the female end and the male pipe and the female pipe can be reused.

DETAILED DESCRIPTION OF THE INVENTION

Figure 1:
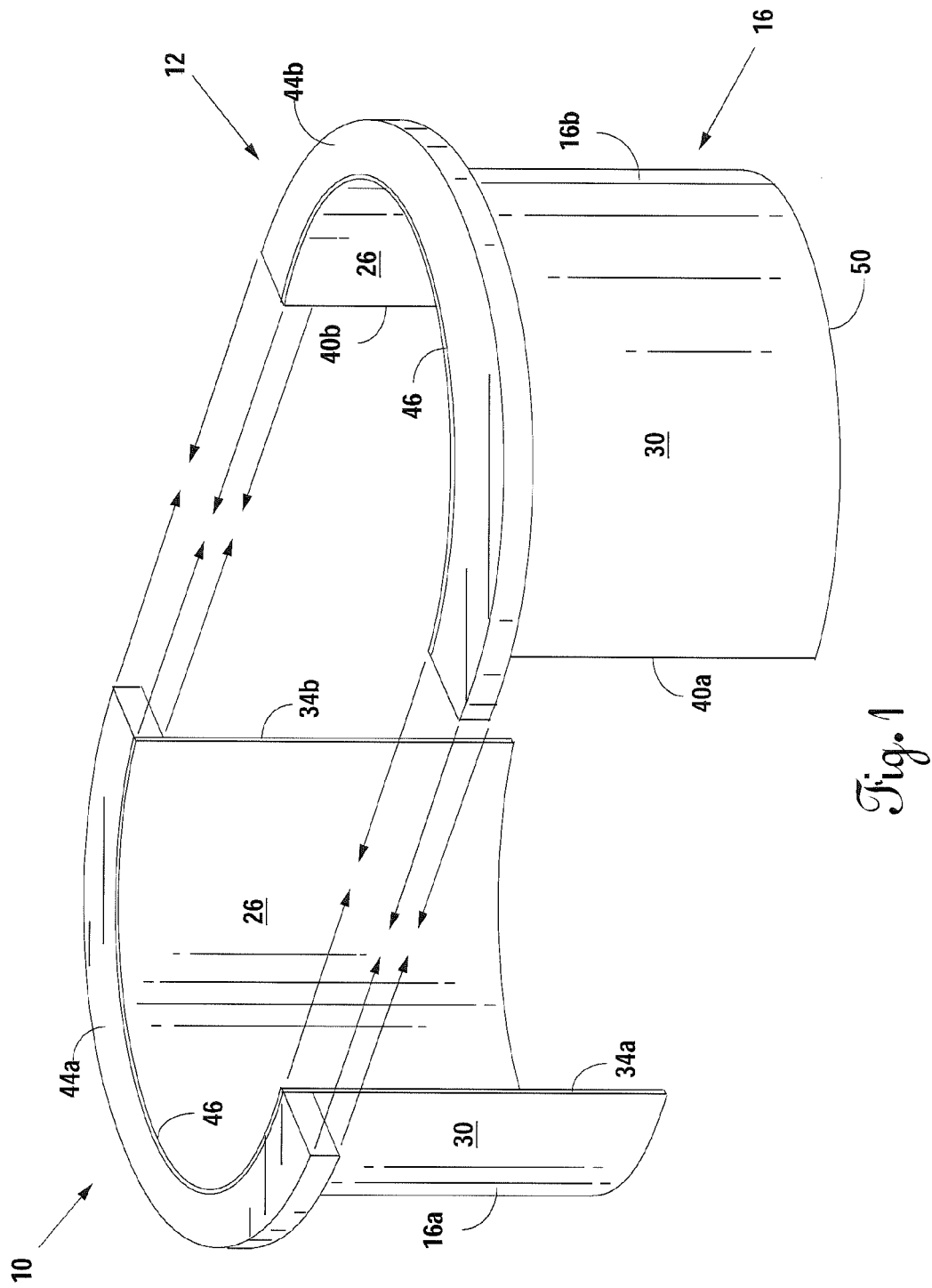
FIG. 1 is an exploded perspective view of the preferred embodiment of the disconnection tool of the present invention showing a first part of the disconnection tool separated from a second part of the disconnection tool.
Figure 2:
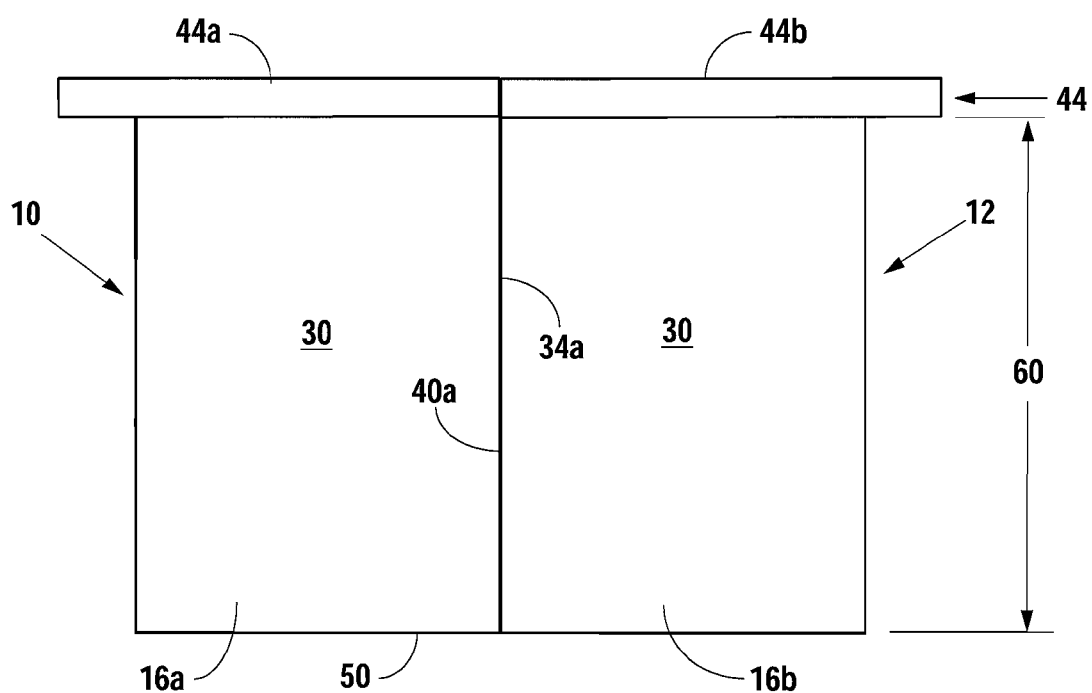
FIG. 2 is a side view of the preferred embodiment of the present invention with the first part of the disconnection tool converged with the second part of the disconnection tool.

Referring to FIGS. 1 & 2, the preferred embodiment of the pipe disconnection tool is shown in an exploded perspective view and front view respectively. In practice, the preferred embodiment of the disconnection tool has a first part 10 and a second part 12 which, when converged together, form the preferred embodiment of the disconnection tool. Preferably, both the first part 10 and the second part 12 have identical structure with semicircular cross sections. Therefore, in the preferred embodiment a description of structure that is present for the first part 10 in the Figures applies equally to a description of the structure for the second part 12, and vice versa.

Figure 3:
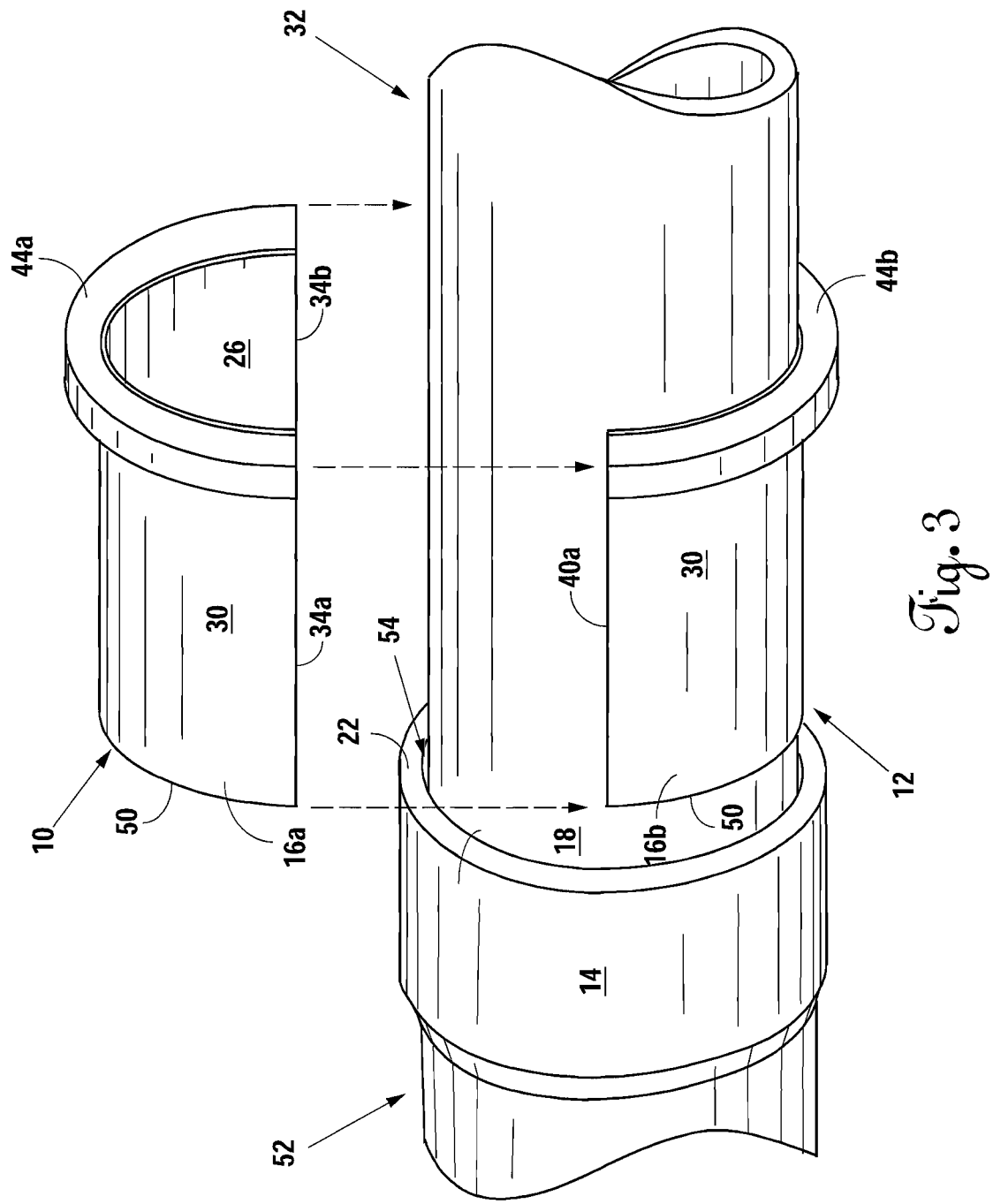
FIG. 3 is an exploded perspective view of the disconnection tool of the present invention being positioned around a male end of a male pipe which is inserted into a female end of a female pipe.

The disconnection tool of the present invention has an insertion member 16 comprised of a first insertion member 16a of the first part 10 and a second insertion member 16b of the second part 12. Each insertion member 16a, 16b is formed by inner walls 26 and outer walls 30. As shown in FIG. 3, each insertion member 16a, 16b is semi-cylindrically shaped such that it can be positioned around and adjacent to an exterior surface 28 of a male end 18 of a male pipe 32. In this regard, the inner walls 26 of the insertion members 16a, 16b are concavely contoured to fit adjacent to and around at least a portion of the convex exterior surface 28 of the male end 18 of the male pipe 32. In this patent application, the exterior surface 28 of the male end 18 of the male pipe 32 is the radially outermost exterior surface of the male end 18.

As shown in FIGS. 1-3, in the preferred embodiment the first part 10 and the second part 12 are converged such that first and second sidewalls 34a, 34b of the first part 10 align with and abut corresponding first and second sidewalls 40a, 40b of the second part 12, thereby forming a cylindrical insertion member 16. Alternatively, the insertion member 16 could be adapted to form a cylindrical insertion member 16 in other manners. For example, the insertion member 16 could be formed of one continuous cylinder.

In the preferred embodiment both the first part 10 and the second part 12 of the disconnection tool have handles 44a, 44b which extend from the first and second insertion members 16a and 16b respectively. As shown in FIG. 1, in the preferred embodiment each handle 44a, 44b is a semicircular flange that extends perpendicular from an end 46 of the insertion member 16 opposite a leading edge 50 of the insertion member 16. Preferably, the semi-circular length of the first handle 44a has ends which are adjacent and aligned with the first and second sidewalls 34a, 34b of the first part 10. Likewise, the semi-circular length of the second handle 44b has ends which are adjacent and aligned with the first and second sidewalls 40a, 40b of the second part 12. As a result, when the insertion member 16 is positioned around the male end 18 of the male pipe 32 and sidewalls 34a, 34b converge with sidewalls 40a, 40b, the ends of each handle 44a, 44b also converge, thereby forming a circular flange around the cylindrical insertion member 16. However, it is anticipated that each handle 44a, 44b may have alternative shapes and sizes and still operate in a manner consistent with this invention. It can also be understood that in an embodiment where the insertion member 16 is one continuous cylinder, the handle 44 may be one continuous flange.

Figure 4:
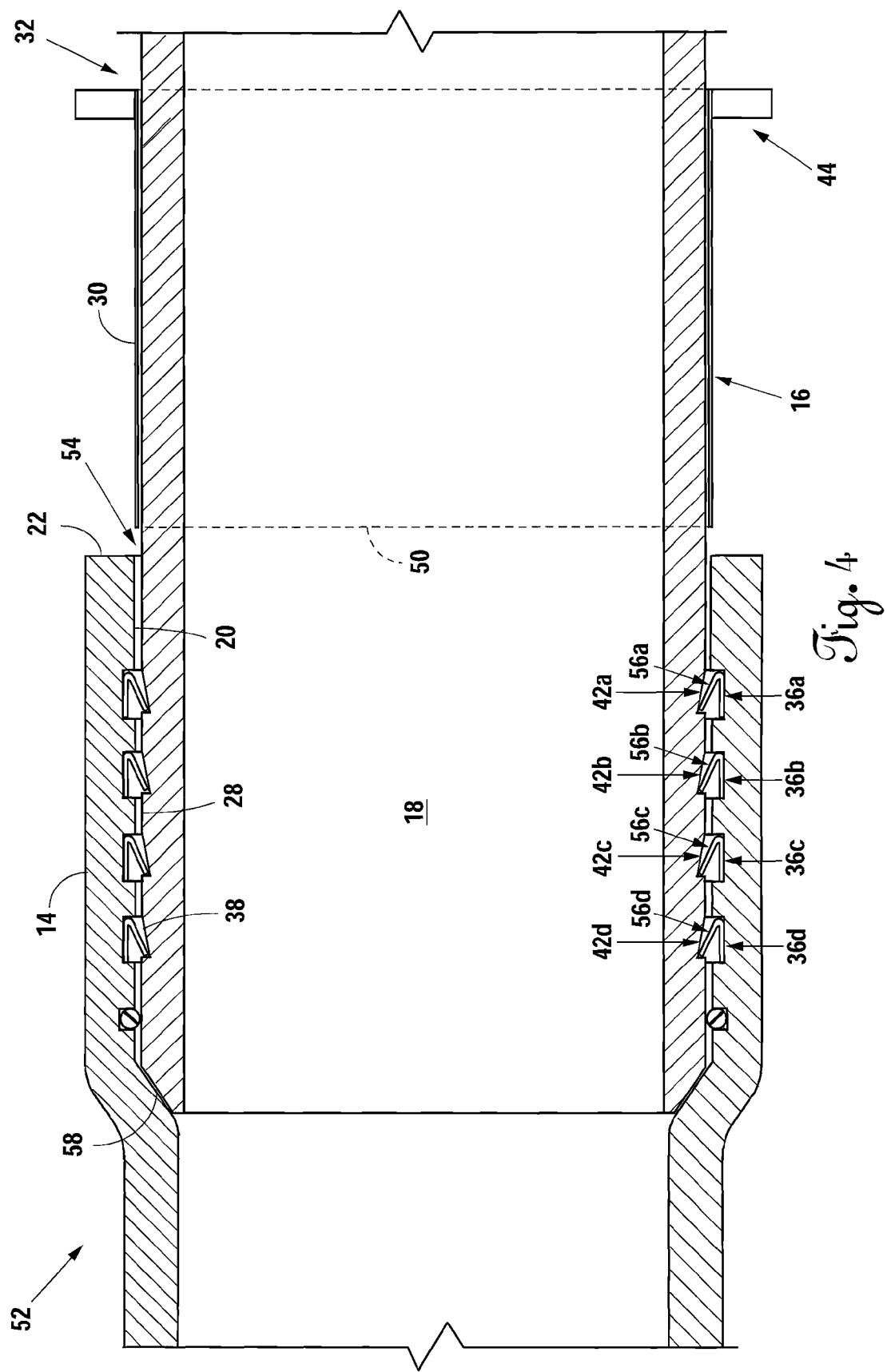
FIG. 4 is a cross sectional side view of the preferred embodiment of the present invention taken along the male end of the male pipe and the female end of the female pipe prior to insertion of the disconnection tool into a clearance between the male end and the female end.

The leading edge 50 of the insertion member 16 is at the end of the insertion member 16 nearest a female end 14 of a female pipe 52 when the insertion member 16 is positioned around the male end 18 of the male pipe 32, prior to insertion of the insertion member 16 (see FIG. 4). Preferably, the leading edge 50 of the insertion member 16 lies in a plane that is perpendicular to the longitudinal axis of the male and female pipes 32, 52. In this application the longitudinal direction is along the axis of the male and female pipes 32, 52 and the axis of the cylindrical or semi-cylindrical insertion member 16. The insertion member 16 has a thickness that is equal to or less than a clearance 54 between the exterior surface 28 of the male end 18 of the male pipe 32 and an interior surface 20 of the female end 14 of the female pipe 52 when the pipes 32, 52 are connected (see FIG. 3).

In order to more fully understand how the insertion member 16 of the disconnection tool fits within this clearance 54 a brief description of the male pipe 32 and female pipe 52 connection is provided. Referring to FIGS. 4-7, in the preferred embodiment the interior surface 20 of the female end 14 of the female pipe 52 defines a male end receiving chamber (not shown), which is essentially the interior space within the female end 14. In this application the interior surface 20 of the female end 14 of the female pipe 52 is the radially innermost interior surface of the female end 14. When the male pipe 32 is connected to the female pipe 52 the male end 18 of the male pipe 32 is positioned within the male end receiving chamber of the female end 14 of the female pipe 52. The exterior surface 28 of the male end 18 has an outer diameter less than the diameter of the male end receiving chamber and the clearance 54 is present in the male end receiving chamber between the exterior surface 28 of the male end 18 of the male pipe 32 and the interior surface 20 of the female end 14 of the female pipe 52. In the preferred embodiment for a male pipe 32 with an outside diameter of five inches, the clearance 54 is approximately 0.0525 inches.

Referring again to FIGS. 4-7, the preferred disconnection tool of the present invention is shown in operation, with the disconnection tool being moved toward and into the female end 14 of the female pipe 52. FIG. 4 shows the preferred embodiment prior to insertion of the insertion member 16. A plurality of sets 56a, b, c, d of rigid fingers 38 extend from interior circumferential grooves 36a, b, c, d on the interior surface 20 of the female end 14 of the female pipe 52 into the male end receiving chamber, across the clearance 54, and into corresponding exterior circumferential grooves 42a, b, c, d on the exterior surface 28 of the male end 18 of the male pipe 32.

Figure 5:
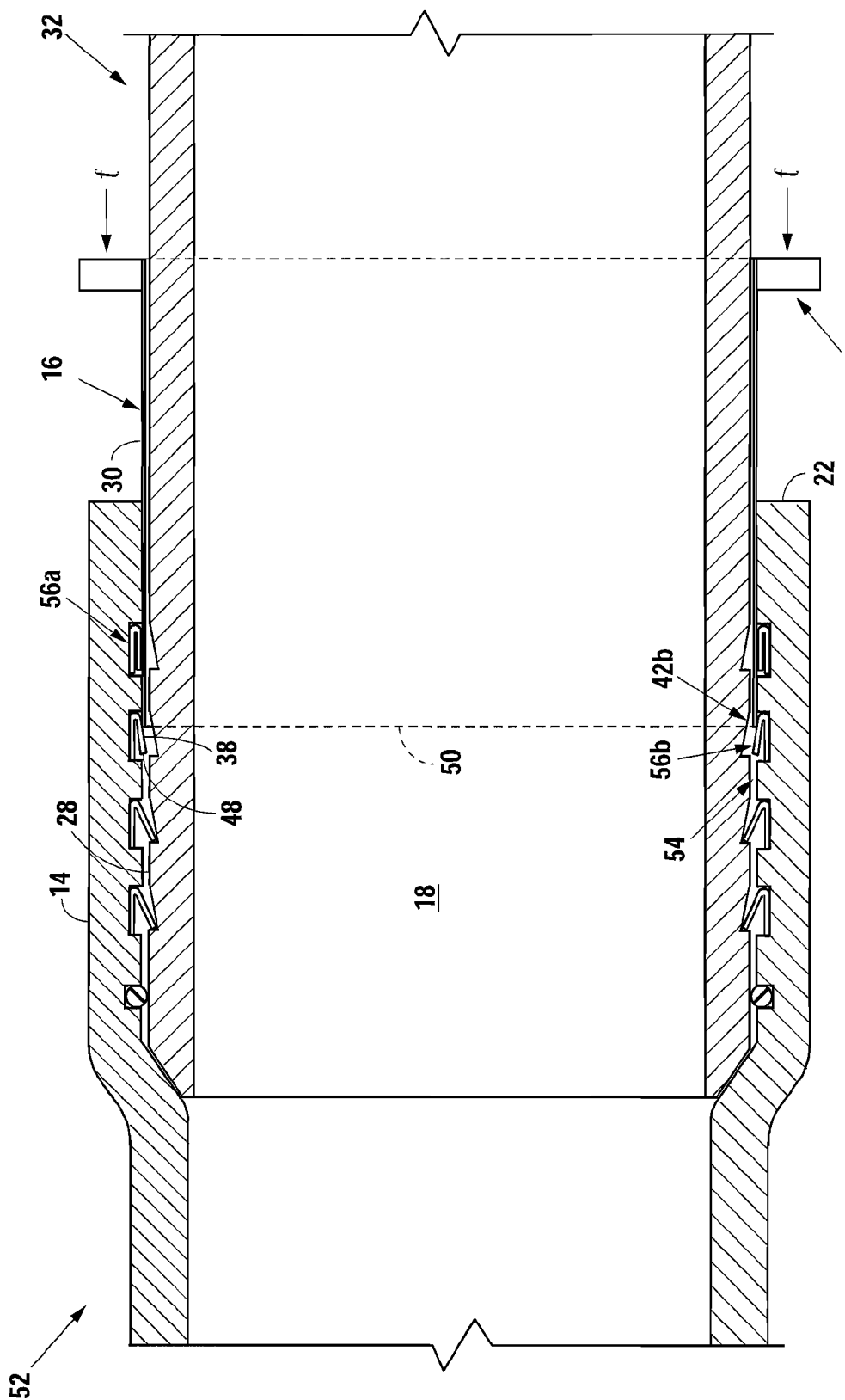
FIG. 5 is a cross sectional side view of the preferred embodiment of the present invention taken along the male end of the male pipe and the female end of the female pipe, with the disconnection tool being inserted into a clearance between the male end and the female end and engaging the rigid fingers within the clearance.

Referring to FIG. 5, a cross section of the male end 18 of the male pipe 32 connected to the female end 14 of the female pipe 52 is shown with a portion of the insertion member 16 inserted into the clearance 54. Insertion member 16 is inserted into the clearance 54 by moving the insertion member 16 with a force f toward the female pipe 52. Force f causes longitudinal movement of the insertion member 16 along the exterior surface 28 of the male end 18 of the male pipe 32. Preferably, force f is a force parallel to the male pipe 32 and is applied to each handle 44a, 44b of the disconnection tool.

Figure 6:
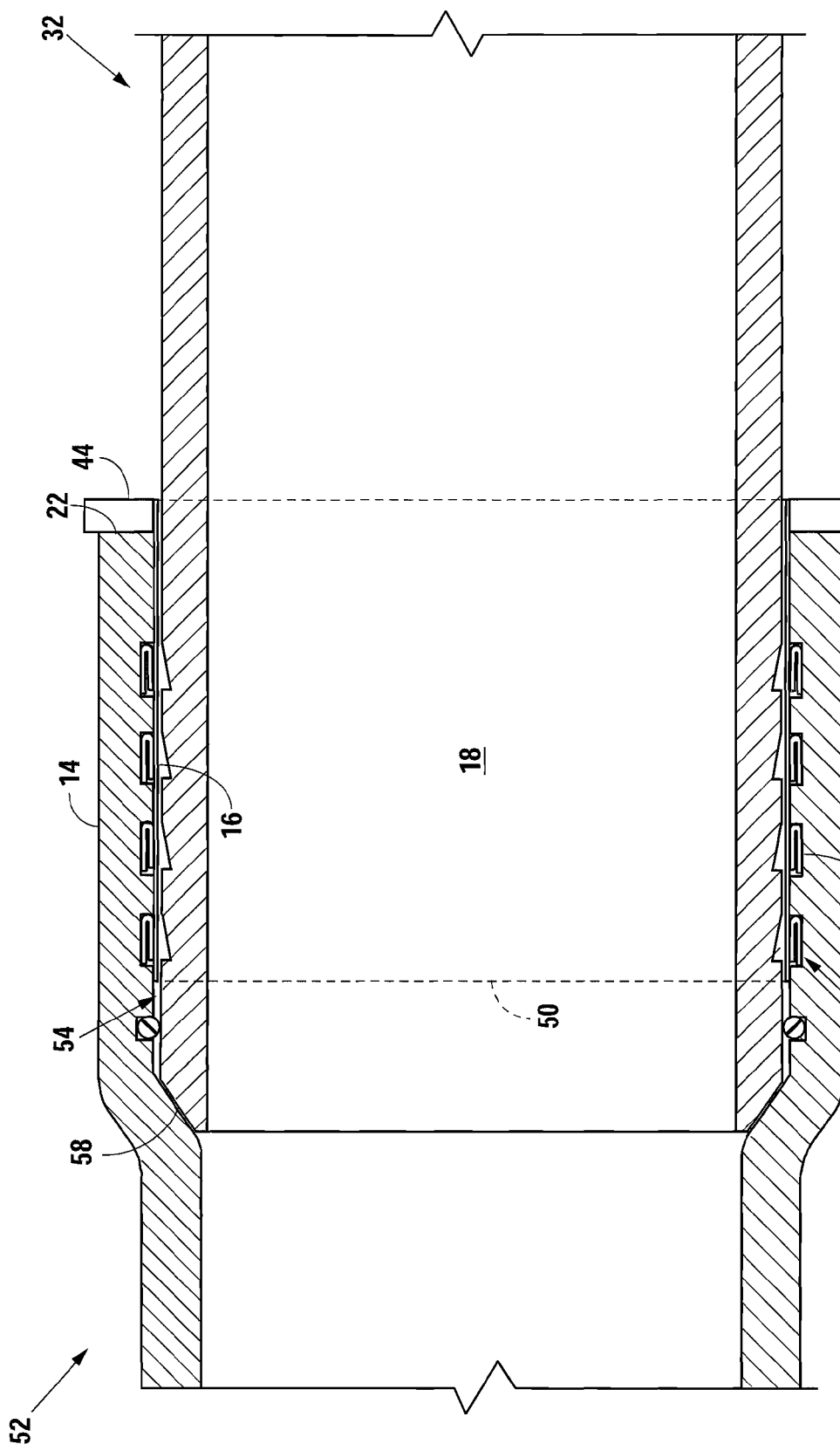
FIG. 6 is the same view as depicted in FIG. 4, with the disconnection tool being fully inserted into the clearance between the male end of the male pipe and the female end of the female pipe.
Figure 7:
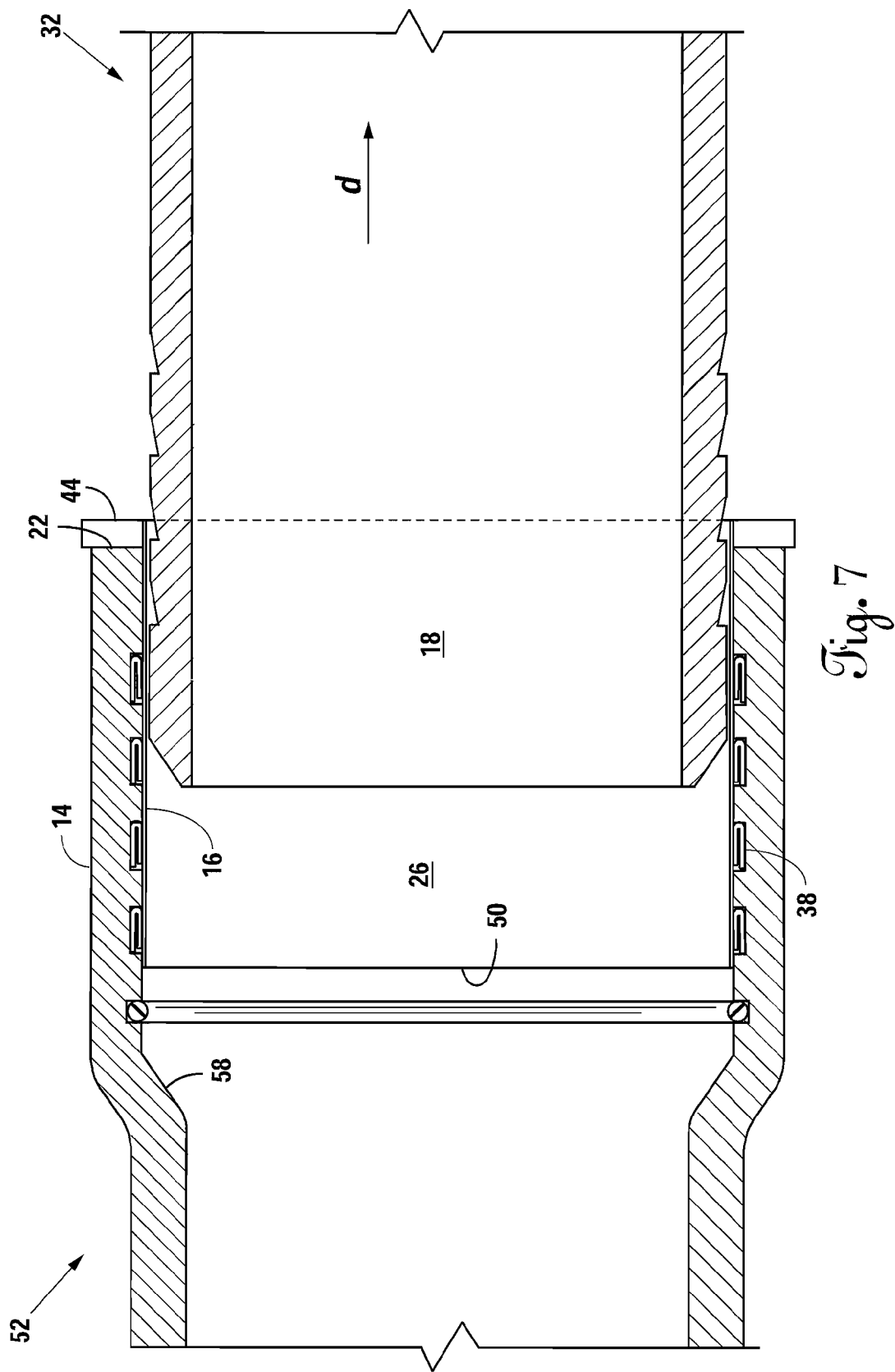
FIG. 7 is the same view as depicted in FIG. 5, with the male end of the male pipe being withdrawn from the female end of the female pipe.

As shown in FIGS. 5-7, the disconnection tool displaces the rigid fingers 38 from each of the sets 56a, b, c, d from the exterior circumferential grooves 42a, b, c, d on the exterior surface 28 of the male end 14 of the male pipe 32. FIG. 5 shows the leading edge 50 of the insertion member 16 engaging the second set 56b of rigid fingers 38 and displacing the rigid fingers 38 from the corresponding exterior circumferential groove 42b on the male end 14 of the male pipe 32. As shown, a distal end 48 of each of the rigid fingers 38 is displaced out of the corresponding exterior circumferential groove 42b. The leading edge 50 of the insertion member 16 already has passed over and displaced the first set 56a of rigid fingers 38 in the same manner as described with regard to the second set 56b of rigid fingers 38. Once displaced, the outer walls 30 of the insertion member 16 hold the distal end 48 of each of the rigid fingers 38 out of the corresponding exterior circumferential grooves 42a, b, c, b on the male end 18 of the male pipe 32.

The insertion member 16 should be made of a rigid material to displace and hold the rigid fingers 38. In addition, the handle 44 is also preferably made from a rigid material. In the preferred embodiment both the insertion member 16 and the handle 44 are made from stainless steel.

Referring now to FIG. 6, the insertion member 16 is shown fully inserted into the clearance 54 between the male end 18 of the male pipe 32 and the female end 14 of the female pipe 52. Preferably, when the insertion member 16 is fully inserted each handle 44a, 44b abuts a leading edge 22 of the female end 14 and acts as a stop to keep the insertion member 16 from being further inserted into the clearance 54. As such, in the preferred embodiment with a five inch male pipe 32, each handle 44a, 44b is five inches away from the leading edge 50 of the insertion member 16. Alternatively, the leading edge 50 of the insertion member 16 may abut a shoulder 58 within the female end 14, or, a stop member (not shown) may be disposed on the insertion member 16 and abut the female leading edge 22 of the female pipe 52, to stop further insertion of the insertion member 16.

The insertion member 16 has an insertion length 60 which is the length of the portion of the insertion member 16 that is positioned in the clearance 54 when the insertion member 16 is fully inserted (see FIG. 2). Preferably, the insertion length 60 is long enough for outer walls 30 of the insertion member 16 to displace and hold the distal end 48 of all the rigid fingers 38 out of their corresponding exterior circumferential groove on the male end 18 of the male pipe 32. However, the insertion length 60 could be just long enough so the leading edge 50 of the insertion member 16 holds the distal end 48 of the last set of rigid fingers 38 out of their corresponding exterior circumferential groove on the male end 18. In the preferred embodiment, each handle 44a, 44b is positioned such that the longitudinal distance from the leading edge 50 of the insertion member 16 to each handle 44a, 44b is greater or equal to the insertion length 60 of the insertion member 16. For a five inch male pipe 32 the insertion length 60 is preferably five inches long.

With the insertion member 16 fully inserted into the clearance 54, the male end 18 of the male pipe 32 can now be withdrawn from the female end 14 of the female pipe 52. To withdraw the male end 18, the male pipe 32 is pulled from within the male end receiving chamber and insertion member 16 in the direction d shown in FIG. 7. Once the male end 18 has been withdrawn, the insertion member 16 is removed from the female end 14 of the female pipe 52.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

We claim:

1. A pipe disconnection system for disconnecting adjoining pipes, the system comprising:
    a male end of a male pipe having a longitudinal axis;
    a female end of a female pipe, wherein said male end is inserted within said female end with a clearance therebetween; and
    a pipe disconnection tool comprising:
        an insertion member comprising a plurality of parts and shaped to be positioned at least partially around and adjacent an exterior surface of said male end of said male pipe while said male pipe is connected to said female pipe;
        said insertion member having an inner wall, an outer wall opposite said inner wall, and an insertion length;
        said insertion member having a thickness between said inner wall and said outer wall which is less than or equal to said clearance between said male end of said male pipe and said female end of said female pipe;
        said insertion member having a leading edge at one end positioned around said male end of said male pipe, said leading edge forming an annular surface that is at least substantially continuous and disposed completely within a plane perpendicular to the longitudinal axis of said male pipe, wherein the plurality of parts are configured to converge to be contiguous at the leading edge; and
        at least one handle connected to said insertion member wherein said handle is positioned a longitudinal distance from said leading edge a distance equal to or greater than said insertion length,
    wherein said leading edge of said disconnection tool is completely removable from the clearance between said male end and said female end when said male pipe is connected to said female pipe, and
    wherein the pipe disconnection tool is configured to disconnect the male pipe and the female pipe from each other when the pipe disconnection tool is advanced along the longitudinal axis toward the female pipe, without need for rotation of the pipe disconnection tool about the longitudinal axis.

2. The pipe disconnection system of claim 1 wherein said insertion member is in the shape of at least a partial cylinder.

3. The pipe disconnection system of claim 2 wherein said handle is a flange which extends from the entire circumference of said partial cylinder.

4. The pipe disconnection system of claim 1 wherein said handle is a flange which extends from an end of said insertion member which is opposite said leading edge of said insertion member.

5. The pipe disconnection system of claim 1 wherein said insertion member is cylindrical and sized to be positioned adjacent to and around the entire exterior surface of said male end of said male pipe.

6. The pipe disconnection system of claim 5 wherein said pipe disconnection tool is formed by two pieces that when converged together around and adjacent the exterior surface of said male end of said male pipe abut along a longitudinal plane.

7. The pipe disconnection system of claim 1 wherein a stop is disposed on said insertion member preventing further insertion of said insertion member into said clearance.

8. The pipe disconnection system of claim 7 wherein said handle is said stop.

9. The pipe disconnection system of claim 1 wherein said disconnection tool is made of stainless steel.

10. A method for disconnecting a male end of a male pipe connected to a female end of a female pipe, the male pipe having a longitudinal axis, the method comprising:
    positioning an insertion member comprising a plurality of parts, the insertion member adjacent to and around an exterior surface of said male end of said male pipe, said insertion member having a leading edge, said leading edge forming an annular surface that is at least substantially continuous and disposed completely within a plane perpendicular to a longitudinal axis of said male pipe, wherein the plurality of parts are contiguous at the leading edge;
    inserting an insertion length of said insertion member into a clearance between said exterior surface of said male end of said male pipe and an interior surface of said female end of said female pipe;
    engaging at least one locking finger which extends into the clearance and into at least one groove on the exterior surface of said male end of said male pipe with said insertion member;
    displacing said at least one locking member with said insertion member; and disconnecting said male end of said male pipe from said female end of said female pipe by advancing the insertion member along the longitudinal axis toward the female pipe, without need for rotation of the insertion member about the longitudinal axis.

11. The method as recited in claim 10 further comprising withdrawing said insertion member from said female end of said female pipe.

12. The method as recited in claim 10 further comprising applying force to a handle extending from said insertion member.

13. The method as recited in claim 10 wherein positioning said insertion member at least partially around the exterior surface of said male end of said male pipe further comprises positioning said insertion member entirely around the exterior surface of said male end.

14. The method as recited in claim 10 wherein engaging at least one locking member occurs when a leading edge of said insertion member engages said at least one locking member.

15. The method as recited in claim 10 further comprising stopping said insertion of said insertion member with a stop disposed on the insertion member.

16. The method as recited in claim 15 wherein stopping said insertion of said insertion member with a stop disposed on the insertion member comprises stopping said insertion of said insertion member with a handle extending from said insertion member.

17. A method for disconnecting a male end of a male pipe connected to a female end of a female pipe, the male pipe having a longitudinal axis, the method comprising:
  converging two insertion members to form a cylinder around and adjacent to an exterior surface of said male end of said male pipe, said insertion members contiguously forming a leading edge, said leading edge forming an annular surface that is at least substantially continuous and disposed completely within a plane perpendicular to the longitudinal axis of said male pipe;
  inserting at least a portion of said cylinder into a clearance between said exterior surface of said male end of said male pipe and an interior surface of said female end of said female pipe;
  engaging at least one locking finger which extends into at least one groove on the exterior surface of said male end of said male pipe with a leading edge of said cylinder;
  displacing said at least one locking finger out of said at least one groove on said exterior surface of said male end of said male pipe; and,
  disconnecting said male end of said male pipe from female end of said female pipe by advancing the insertion member along the longitudinal axis toward the female pipe, without need for rotation of the insertion member about the longitudinal axis.

18. The method as recited in claim 17 wherein converging two insertion members to form a cylinder around and adjacent to an exterior surface of said male end of said male pipe comprises converging two insertion members, each insertion member including a handle extending therefrom, to form a cylinder around and adjacent to an exterior surface of said male end of said male pipe.

19. The method as recited in claim 18 further comprising applying force in a direction parallel to the longitudinal direction of said male pipe to each of said handles.

20. The method as recited in claim 18 or 19 wherein converging two insertion members to form a cylinder around and adjacent to an exterior surface of said male end of said male pipe comprises converging two insertion members, each insertion member including a flange extending therefrom that converges with the other handle, to form a cylinder around and adjacent to an exterior surface of said male end of said male pipe.

21. The method as recited in claim 17 further comprising removing said cylinder from said female end of said female pipe.

22. The method as recited in claim 17 further comprising stopping said insertion of said cylinder with a stop disposed on each of the insertion members.

23. The method as recited in claim 22 wherein stopping said insertion of said cylinder with a stop disposed on each of the insertion members comprises stopping said insertion of said cylinder with a handle extending from each of the insertion members.

24. A pipe disconnection system comprising:
  a male end of a male pipe having a longitudinal axis;
  a female end of a female pipe, wherein said male end is inserted within said female end with a clearance therebetween; and
  a pipe disconnection tool comprising:
    an insertion member in the shape of at least a partial cylinder, said insertion member comprising an inner wall, an outer wall, and a thickness between said inner wall and said outer wall;
    said insertion member having a longitudinal insertion length;
    a leading edge terminating one end of said insertion member; and
    a handle extending from said insertion member positioned a longitudinal distance from said leading edge equal to or greater than the insertion length,
  wherein said insertion member is comprised of at least two parts converged together such that said leading edge forms an annular surface that is at least substantially continuous and disposed completely within a plane perpendicular to the longitudinal axis of said male pipe and the two parts are contiguous at the leading edge,
  wherein said leading edge of said disconnection tool is completely removable from the clearance between said male end and said female end when said male pipe is connected to said female pipe, and
  wherein the pipe disconnection tool is configured to disconnect the male pipe and the female pipe from each other when the pipe disconnection tool is advanced along the longitudinal axis toward the female pipe, without need for rotation of the pipe disconnection tool about the longitudinal axis.

25. The pipe disconnection system of claim 24 wherein said handle is a flange extending from said insertion member.

26. The pipe disconnection system of claim 25 wherein said handle extends from an end of said insertion member opposite said leading edge.

27. The pipe disconnection system of claim 26 wherein said at least partial cylinder is a full cylinder.

28. The pipe disconnection system of claim 24 wherein said insertion member and said handle are divided along a longitudinal plane to form a first part with a first handle and a second part with a second handle.

29. The pipe disconnection system of claim 28 wherein said first handle is a flange extending from said first part of said insertion member and said second handle is a flange extending from said second part of said insertion member.

30. The pipe disconnection system of claim 28 wherein said longitudinal distance between said first handle and said leading edge is equal to said longitudinal distance between said second handle and said leading edge.

31. The pipe disconnection system of claim 30 wherein each handle extends from an end of said insertion member opposite said leading edge.

32. The pipe disconnection system of claim 28 wherein said insertion member is a full cylinder.

33. The pipe disconnection system of claim 32 wherein said first handle of said first part and said second handle of said second part are semi-circular.

34. The pipe disconnection system of claim 28 wherein said insertion member is divided such that said first part and said first handle are identical to said second part and said second handle.

35. A pipe disconnection system comprising:
a female end of a female pipe with an interior surface and a female leading edge terminating said female end, said interior surface of said female end defining a male end receiving chamber;
a male end of a male pipe having a longitudinal axis, said male end inserted into the male end receiving chamber of said female end of said female pipe, said male end having an exterior surface with a circumference smaller in diameter than the diameter of said male end receiving chamber of said female end of said female pipe;
at least one locking member engaging both said male end and said female end;
a pipe disconnection tool having an insertion member comprising a plurality of parts with a leading edge inserted into said male end receiving chamber between said exterior surface of said male end of said male pipe and said interior surface of said female end of said female pipe, said leading edge forming an annular surface that is at least substantially continuous and positioned completely within a plane perpendicular to the longitudinal axis of said male pipe, wherein the plurality of parts are configured to be contiguous at the leading edge, said insertion member having an insertion length sufficient to engage said at least one locking member with the leading edge of said insertion member and disengage said at least one locking member from engaging said male end or said female end; and,
wherein said pipe disconnection system is configured such that the leading edge of said insertion member is completely removable from said male end receiving chamber while said male pipe and said female pipe are connected, and
wherein the pipe disconnection tool is configured to disconnect the male pipe and the female pipe from each other when the pipe disconnection tool is advanced along the longitudinal axis toward the female pipe, without need for rotation of the pipe disconnection tool about the longitudinal axis.

36. The pipe disconnection system of claim 35 wherein said at least one locking member extends from at least one interior circumferential groove on the interior surface of said female end and into a corresponding exterior circumferential groove on the exterior surface of said male end.

37. The pipe disconnection system of claim 36 wherein said at least one locking member is a plurality of displaceable rigid fingers, said plurality of displaceable rigid fingers extending from said interior circumferential groove into said male end receiving chamber at an acute angle directed away from said female leading edge, and wherein said insertion length is sufficient to position said insertion member between said plurality of displaceable rigid fingers extending from said at least one interior circumferential groove of said female end of said female pipe and said corresponding exterior circumferential groove on the exterior surface of said male end of said male pipe.

38. The pipe disconnection system of claim 35 wherein said pipe disconnection tool further comprises a handle connected to said insertion member, said handle being positioned a longitudinal distance from a leading edge of said insertion member which is equal to or greater than the insertion length.

39. The pipe disconnection system of claim 38 wherein said pipe disconnection tool further comprises a stop disposed on said insertion member which abuts said female leading edge and prevents further insertion of said insertion member.

40. The pipe disconnection system of claim 39 wherein said handle of said pipe disconnection tool is said stop.

41. A pipe disconnection system for disconnecting adjoining pipes, the system comprising:
a male end of a male pipe having a longitudinal axis;
a female end of a female pipe, wherein said male end is inserted within said female end with a clearance therebetween; and
a pipe disconnection tool comprising:
an insertion member comprising a plurality of parts and shaped to be positioned at least partially around and adjacent an exterior surface of said male end of said male pipe while said male pipe is connected to said female pipe;
said insertion member having an inner wall, an outer wall opposite said inner wall, and an insertion length;
said insertion member having a thickness between said inner wall and said outer wall which is less than or equal to said clearance between said male end of said male pipe and said female end of said female pipe;
said insertion member having a leading edge at one end positioned around said male end of said male pipe, said leading edge forming an annular surface that is at least substantially continuous disposed completely within a plane perpendicular to the longitudinal axis of said male pipe, wherein the plurality of parts are configured to converge to be contiguous at the leading edge; and
at least one handle connected to said insertion member wherein said handle is positioned a longitudinal distance from said leading edge a distance equal to or greater than said insertion length,
wherein said male end and said female end are connectable to each other without said leading edge of said insertion member first being inserted into said clearance, and
wherein the pipe disconnection tool is configured to disconnect the male pipe and the female pipe from each other when the pipe disconnection tool is advanced along the longitudinal axis toward the female pipe, without need for rotation of the pipe disconnection tool about the longitudinal axis.

42. A pipe disconnection system comprising:
a male end of a male pipe having a longitudinal axis;
a female end of a female pipe, wherein said male end is inserted within said female end with a clearance therebetween; and
a pipe disconnection tool comprising:
an insertion member comprising a plurality of parts in the shape of at least a partial cylinder, said insertion member comprising an inner wall, an outer wall, and a thickness between said inner wall and said outer wall;

said insertion member having a longitudinal insertion length;

a leading edge terminating one end of said insertion member, said leading edge positioned around said male end of said male pipe and forming an annular surface that is at least substantially continuous and disposed completely within a plane perpendicular to the longitudinal axis of said male pipe, wherein the plurality of parts are configured to converge to be contiguous at the leading edge; and a handle extending from said insertion member positioned a longitudinal distance from said leading edge equal to or greater than the insertion length;

wherein said male end and said female end are connectable to each other without the leading edge of said insertion member first being inserted into said clearance, and wherein the pipe disconnection tool is configured to disconnect the male pipe and the female pipe from each other when the pipe disconnection tool is advanced along the longitudinal axis toward the female pipe, without need for rotation of the pipe disconnection tool about the longitudinal axis.

43. A pipe disconnection system comprising:

a female end of a female pipe with an interior surface and a female leading edge terminating said female end, said interior surface of said female end defining a male end receiving chamber;

a male end of a male pipe having a longitudinal axis, said male end inserted into the male end receiving chamber of said female end of said female pipe, said male end having an exterior surface with a circumference smaller in diameter than the diameter of said male end receiving chamber of said female end of said female pipe;

at least one locking member engaged with both said male end and said female end; and a pipe disconnection tool having an insertion member comprising a plurality of parts and with a leading edge insertable into said male end receiving chamber between said exterior surface of said male end of said male pipe and said interior surface of said female end of said female pipe while said male pipe and said female pipe are connected, said insertion member having an insertion length sufficient to engage said at least one locking member with the leading edge of said insertion member and disengage said at least one locking member from its engagement with said male end and said female end, wherein said male end and said female end are connectable to each other without the leading edge of said insertion member first being inserted into said male end receiving chamber, wherein said insertion member leading edge is positioned around said male end of said male pipe and forms an annular surface that is at least substantially continuous and disposed completely within a plane perpendicular to the longitudinal axis of said male pipe, wherein the plurality of parts are configured to converge to be contiguous at the leading edge, and wherein the pipe disconnection tool is configured to disconnect the male pipe and the female pipe from each other when the pipe disconnection tool is advanced along the longitudinal axis toward the female pipe, without need for rotation of the pipe disconnection tool about the longitudinal axis.

44. The pipe disconnection system of claim 37 wherein said plurality of displaceable rigid fingers extends from a band seated in said interior circumferential groove of said female end of said female pipe.

* * * * *